Dec. 9, 1941.  W. W. HARTMAN  2,265,600
BLADE GRINDING MACHINE
Filed March 15, 1940   7 Sheets-Sheet 1
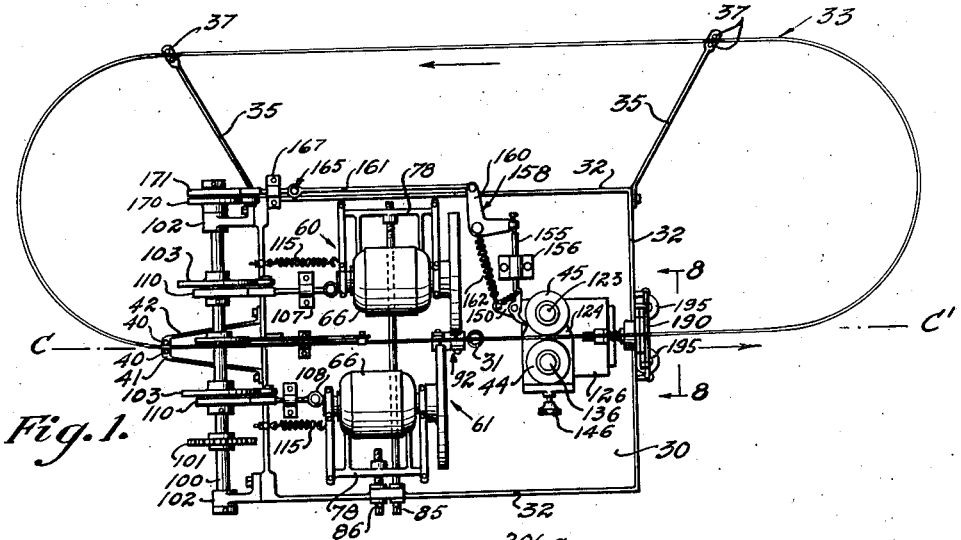
Fig. 1.
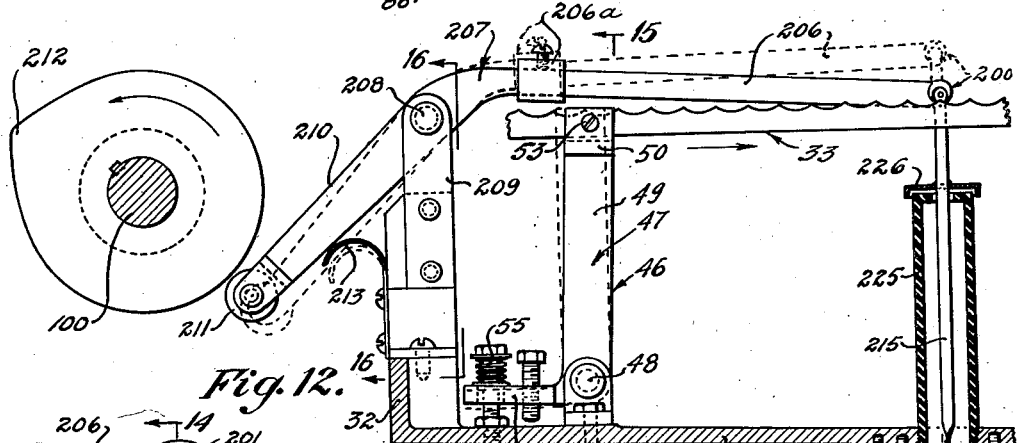
Fig. 12.
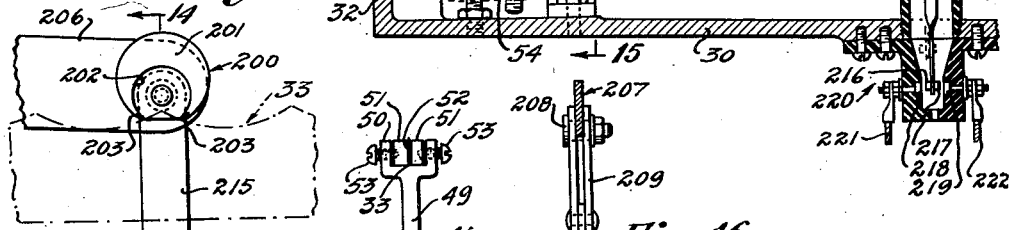
Fig. 13.   Fig. 16.
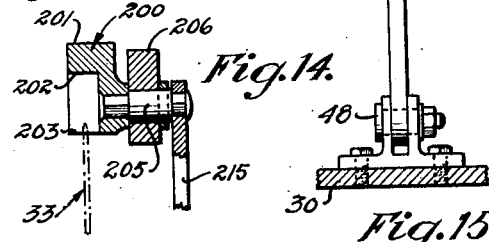
Fig. 14.   Fig. 15.
Inventor:
William Walter Hartman.
Attorneys.

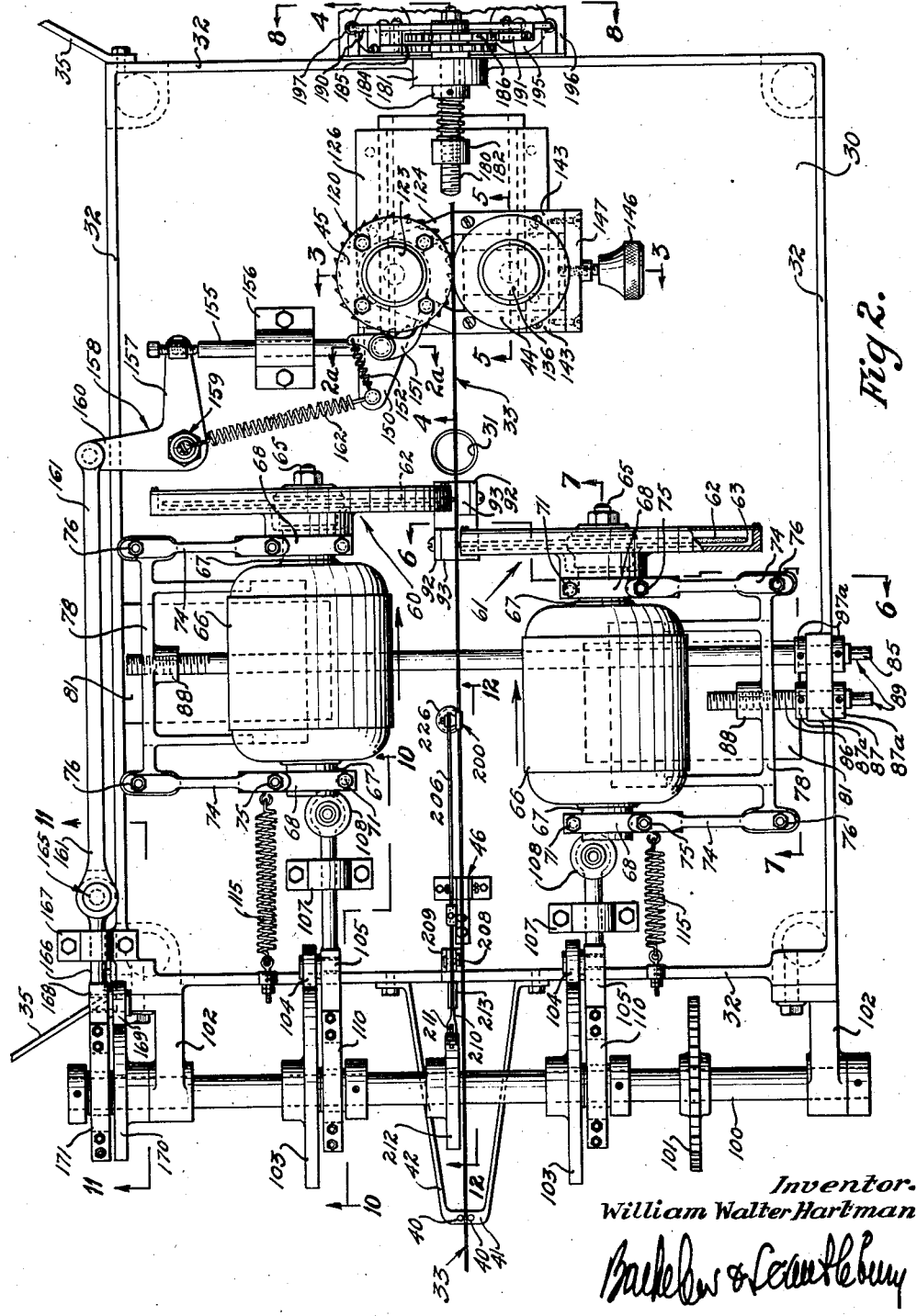

Dec. 9, 1941.  W. W. HARTMAN  2,265,600
BLADE GRINDING MACHINE
Filed March 15, 1940  7 Sheets-Sheet 3

Inventor.
William Walter Hartman.
Attorneys.

Dec. 9, 1941.  W. W. HARTMAN  2,265,600
BLADE GRINDING MACHINE
Filed March 15, 1940  7 Sheets-Sheet 4
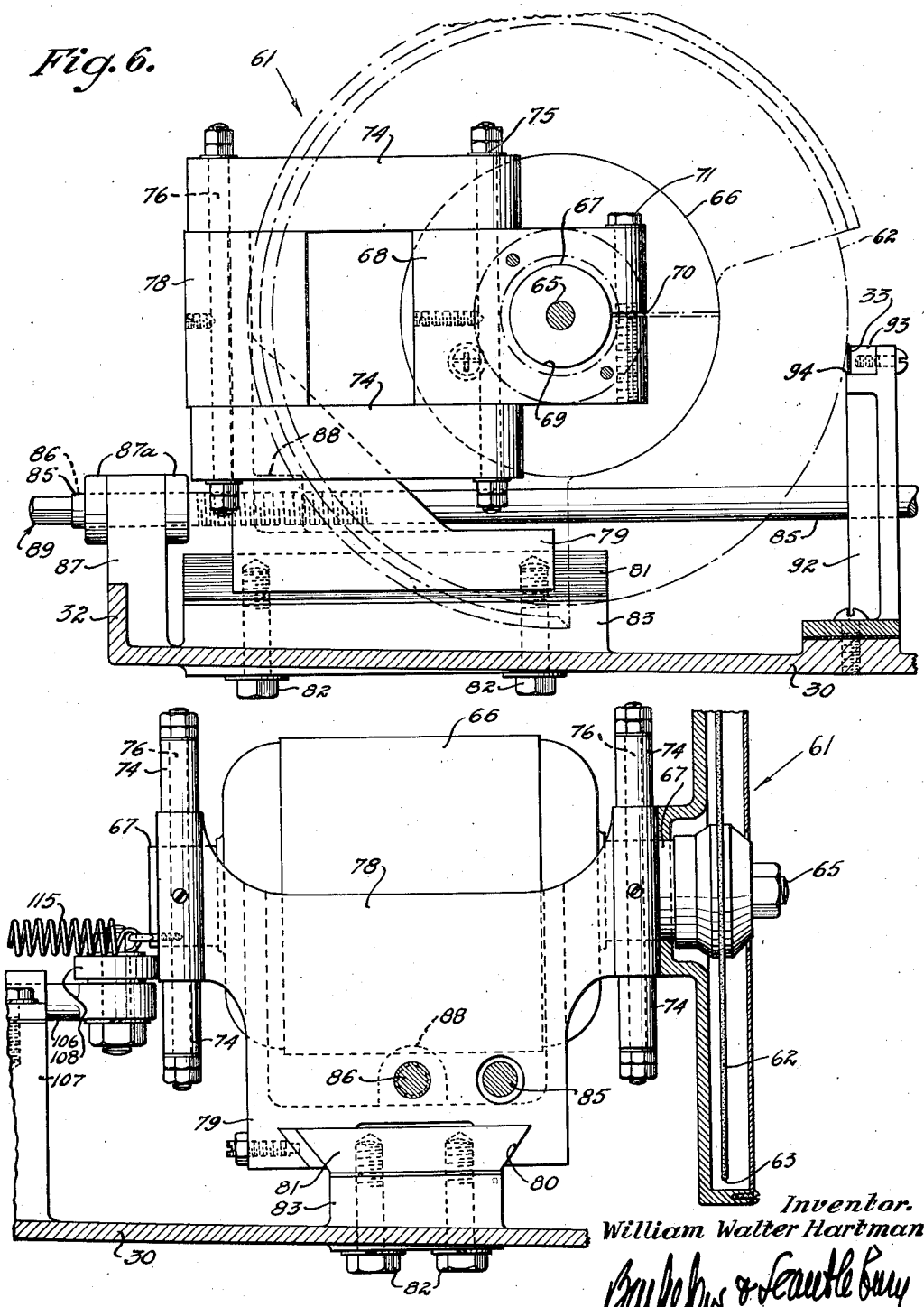
Fig. 6.
Fig. 7.
Inventor.
William Walter Hartman.
Attorneys.

Dec. 9, 1941.   W. W. HARTMAN   2,265,600
BLADE GRINDING MACHINE
Filed March 15, 1940   7 Sheets-Sheet 5

Inventor.
William Walter Hartman.
Attorneys.

Dec. 9, 1941.    W. W. HARTMAN    2,265,600
BLADE GRINDING MACHINE
Filed March 15, 1940    7 Sheets-Sheet 6

Inventor.
William Walter Hartman.
Attorneys.

Dec. 9, 1941.  W. W. HARTMAN  2,265,600
BLADE GRINDING MACHINE
Filed March 15, 1940  7 Sheets-Sheet 7

Inventor.
William Walter Hartman.

Attorneys.

Patented Dec. 9, 1941

2,265,600

UNITED STATES PATENT OFFICE 2,265,600

BLADE GRINDING MACHINE

William Walter Hartman, Los Angeles, Calif.

Application March 15, 1940, Serial No. 324,125

24 Claims. (Cl. 51—33)

This invention relates generally to blade grinding machines, and more particularly to machines for grinding a scalloped, beveled cutting edge on a blade. The invention contemplates primarily the grinding of such a cutting edge on blades of the flexible, endless band type, such as are commonly employed in modern bread slicing machines, though not being necessarily limited thereto.

A machine for grinding a scalloped, beveled edge on a blade is disclosed and broadly claimed in my prior Patent No. 2,118,197. The blade indexing means employed in the machine disclosed in my said prior patent, however, is designed for the relatively short reciprocating type of blade, and is not designed for a blade of the flexible, endless band type, even though the grinding means disclosed is as well adapted for one type of blade as the other. To produce a blade of the scalloped edge type, a length or band of steel first has a scalloped shape formed along one of its edges, which is done by a punching operation, as is well understood. Using a grinding means of the type disclosed in my said prior patent, the blade is then formed with the desired beveled, scalloped cutting edge by moving the periphery of a thin grinding wheel along each of the scallops, from crest to crest, with arcuate back and forth sweeping motions. The grinding wheel clears the blade following the grinding of each scallop, and while the blade is so cleared it is advanced a distance equal to the distance between crests, so that the next scallop may be ground, and so on. In said prior patent a means is disclosed, engageable with the usual end holes of a reciprocating type blade, for accurately indexing the blade, or in other words, for intermittently advancing the blade between positions in which its scallops are accurately in position for proper grinding action by the grinding wheel. As previously mentioned, however, no means is disclosed in said prior patent for indexing a blade of the flexible endless type, which does not have end holes or other means adapted for positive engagement by the feeding means, but must be advanced by friction drive means.

A general object of the present invention is therefore to provide suitable blade indexing mechanism for a blade grinding machine of the type designed for blades of the endless band type.

A further object of the invention is to provide an indexing means adapted for cooperation with a blade grinding means of the type disclosed and claimed in my aforesaid prior patent.

A still further and more general object of the invention is to provide an improved blade grinding machine for blades of the scalloped, beveled type.

Still another object of the invention is the provision of an improved blade indexing mechanism for a blade grinding machine of the type designed for grinding blades of the scalloped, beveled type.

In accordance with a preferred and illustrative form of the present invention, the blade is intermittently advanced by friction drive rollers, which feed the blade on each intermittent operation a distance equal to the distance between the crests of its scalloped edge. The machine is carefully designed so that the distance the blade is fed for each intermittent feeding operation is as closely as possible equal to the distance between crests of the scalloped blade. Nevertheless, because of the frictional nature of the drive between the blade feeding rollers and the blade, a certain slight but inevitable slippage or creepage takes place, and even though the amount of such creepage during each advancement of the blade may be insignificant, nevertheless such creepage, unless compensated, accumulates until a maximum tolerance is exceeded. It is a feature of the present invention that such cumulative creepage is compensated by movement of the blade feeding rollers in a direction longitudinally of the blade, such movement being of course in such a direction as will move the blade bodily in a direction to cancel the creepage which has occurred. Such movement of the blade feeding rollers is under the control of means cooperable with the scalloped edge of the blade, and designed to detect very slight departures of the blade scallops from predetermined position, which position will of course be understood to be that in which a scallop of the blade registers precisely with the grinding arc of the grinding means. When any blade creepage has occurred such as produces a detectable misregistration of the scallops of the blade from the predetermined grinding position, operation of the means for bodily moving the blade feeding rollers in a direction longitudinally of the blade is brought about, and the amount of such movement and its direction are such as to compensate the said detected misregistration.

Various additional objects, features and accomplishments of the invention will appear and be described in the course of the following detailed description of a present illustrative embodiment of the invention, wherein reference is had to the accompanying drawings, in which:

Fig. 1 is a plan view of one embodiment of the invention;

Fig. 2 is an enlargement of the main portion of Fig. 1;

Fig. 2a is a detail section on line 2a—2a of Fig. 2;

Fig. 3 is a section through the blade advancing rollers, being taken on line 3—3 of Fig. 2;

Fig. 4 is a section taken as indicated by broken line 4—4 of Fig. 2;

Fig. 4a is a section taken as indicated by line 4a—4a of Fig. 4;

Fig. 4b is a section on line 4b—4b of Fig. 8;

Fig. 5 is a section taken on line 5—5 of Fig. 2;

Fig. 6 is a section taken on broken line 6—6 of Fig. 2;

Fig. 7 is a section taken on broken line 7—7 of Fig. 2;

Fig. 12 is a view taken as indicated by line 12—12 of Fig. 2;

Fig. 13 is an enlarged detail taken from Fig. 12;

Fig. 14 is a section on line 14—14 of Fig. 13;

Fig. 15 is a section taken on line 15—15 of Fig. 12;

Fig. 16 is a view taken as indicated by line 16—16 of Fig. 12;

Figure 23:
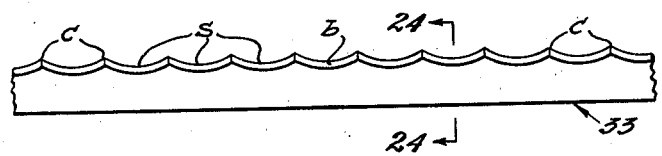
Fig. 23 is a side elevation of a portion of a blade having a beveled, scalloped cutting edge such as is contemplated by the machine of the present invention.
Figure 24:
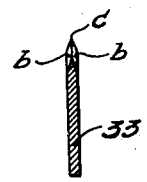
Fig. 24 is an enlarged section taken on line 24—24 of Fig. 23.

Reference is first directed to Figs. 23 and 24 showing a portion of a blade of the type for which the grinding machine of the present invention is designed. The blade will be seen to have successive scallops s (previously formed in any suitable manner, as by a punching operation), terminating in sharply pointed crests c, and the ground edge has a bevel as indicated at b. It is to be understood that, broadly speaking, the present invention may be applied to or used in connection with various types of grinding means for grinding such a beveled, scalloped cutting edge upon a blade, that preferred and here illustrated, however, being of the type disclosed and broadly claimed in my aforesaid prior Patent No. 2,118,197. Thus in its broadest aspects, the present invention is not essentially concerned with or limited to the nature of the specific means employed to perform the grinding operation, so long as there is provided some suitable grinding means adapted to work along a predetermined grinding arc, the scallops s of the blade being brought successively into registration or coincidence with such grinding arc. In more specific aspects, however, the indexing or blade registering mechanism of the present invention is designed particularly for cooperation and coaction with the type of grinding means disclosed in my said prior patent, and certain features of invention are presented in my novel combination of blade indexing means with blade grinding means of the type mentioned.

The particular embodiment of my invention here chosen for illustrative purposes has a rectangular, substantially horizontal base or frame plate 30, preferably sloping gradually toward a drain outlet hole 31, which may be used for circulation of wash fluid, and provided with an upstanding marginal flange 32. The blade, here shown as of the endless, flexible band type, is indicated at 33, and, as illustrated, travels above and lengthwise of rectangular base 30, along the longitudinal center line C—C' thereof. In the particular form of the invention here shown, blade 33 travels from left to right across base 30 as viewed in Figs. 1 and 2, the blade after passing beyond the right hand end of base 30 being doubled back and traveling in a contrary direction to one side of base 30, being finally, at a point to the left of the left-hand end of base 30, doubled forwardly to cross base 30 along the longitudinal center line of the latter as aforesaid. The stretch of blade 33 to one side of base plate 30 may be supported by any suitable guide means; I here show a simple and convenient expedient for this purpose consisting of a pair of arms 35 extending from opposite ends of base plate 30, each provided at its end with a pair of guide pins 37 between which the blade is received, the edge of the blade resting on the extreme end portion of said arms between the guide pins 37, as will be obvious from Fig. 1. The portion of the blade crossing base plate 30 is guided at a point somewhat in advance of said plate between a pair of guide pins 40 spaced on opposite sides of center line C—C' and set into the cross portion 41 of a bracket 42 secured to and extending from the left-hand end of base plate 30, the lower or rearward edge of the blade resting or riding on the portion 41 of bracket 42 as indicated.

Near the opposite or right-hand end of base plate 30, the blade 33 passes between a pressure roller 44 and a friction drive roller 45 of an indexing mechanism (Figs. 2 and 3), said rollers engaging opposite sides of the blade with sufficient pressure that when the roller 45 is rotated, the blade will be advanced without substantial slippage. The indexing mechanism of which these rollers 44 and 45 form a part will be described hereinafter.

The blade is tensioned back of rollers 44 and 45, at a point located toward the opposite end of base 30, so as to provide a tensioned length of blade to be operated on by the grinding means presently to be described. A simple and illustrative means for so tensioning the blade is designated generally by numeral 46 in Figs. 2, 12 and 15, and comprises a bell crank 47 pivotally mounted at 48 on base 30 and having one arm 49 formed with a bifurcated upper end 50 supporting blade guide blocks 51 spaced apart to provide a guide slot 52 for the blade. These guide blocks may be pressed into moderate frictional engagement against opposite side surfaces of the blade as by means of screws 53, or any other suitable expedient. The blocks 51 are preferably formed of some composition material, such as Celeron, adapted to exert a moderate frictional drag on the blade, and yet to permit slippage therebetween when the feed rollers are advanced. The other arm 54 of this bell crank is acted upon by a spring 55 to oppose pivotal movement of the bell crank as the blade is dragged forwardly between the blocks 51. In operation, the blade is intermittently moved in the direction of the arrow in Fig. 12, and slides forwardly between the blocks 51, but by reason of the moderate frictional drag of the blocks on the blade the bell crank is rocked against the pressure of spring 55 to some such a position as illustrated in Fig. 12. When the blade then ceases its advancing movement the bell crank remains in the position of Fig. 12, and, under the actuation of spring 55, functions to tension the blade length between blocks 51 and feed rollers 44 and 45.

Preferably, both sides of the blades are ground simultaneously, though to avoid interference between the two grinding wheels, and to enable use of proper blade backing-up means, individual scallops are not ground simultaneously on both sides. Accordingly, I preferably provide two blade grinding units 60 and 61, one on each side of the tensioned length of the blade between tensioning means 46 and rollers 44 and 45, and these two blade grinding units are offset from one another longitudinally of the blade so as to operate simultaneously on two suitably spaced scallops of the blade.

In the particular embodiment of my invention here chosen for illustrative purposes, each of grinding units 60 and 61 is of the type disclosed in my prior Patent No. 2,118,197. The two units may be substantial duplicates of one another, and corresponding parts thereof will accordingly be designated by like reference numerals. Each grinding unit has a comparatively thin grinder or grinding wheel 62, having a curved grinding periphery 63, and this grinding wheel is mounted in a conventional manner on a grinder shaft 65, which in turn is rotatably carried in shaft-supporting means that in this instance comprise the body of electric motor 66. Motor 66 serves to drive the grinder shaft, though obviously any other means for driving shaft 65 may be substituted if desired. Mounted on the tubular boss 67 at each end of the case of motor 66 is a rectangular block 68, which has a bore 69 receiving boss 67, and is split at 70 and clamped tightly to boss 67 by means of screws 71, all as clearly illustrated in Fig. 6.

Block 68, which is thus rigidly attached to the case of motor 66, is carried by a pair of links 74, each of which is pivotally connected at 75 to block 68, and is pivotally mounted at 76 on a supporting frame 78. Supporting frame 78 has at the bottom a base portion 79 extending transversely of blade 33 and formed with a dove-tailed way 80 slidably mounted on a dove-tail supporting plate 81, the latter being secured, as by screws 82, to a stationary base 83 cast integrally with frame 30. Frame 78, together with the motor and grinding wheels carried thereby through links 74, is thus mounted for sliding adjustment movement transversely of blade 33, and it will be evident that this adjustment enables the periphery of grinding wheel 62 to be adjusted with relation to blade 33. This adjustment is accomplished through a lead screw 85 for grinding unit 60 and a lead screw 86 for grinding unit 61, both being mounted for rotation in a bearing block 87 cast integrally with base 30, and being confined against axial travel with relation to block 87 as by collars 87a (see Fig. 2). The two lead screws have screwthreaded engagement with internally screwthreaded tubular bosses 88 cast integrally with supporting frames 78, while the ends of lead screws 85 and 86 that project outside bearing 87 are squared, as indicated at 89, for engagement by a suitable wrench or other operating tool.

Figure 22:
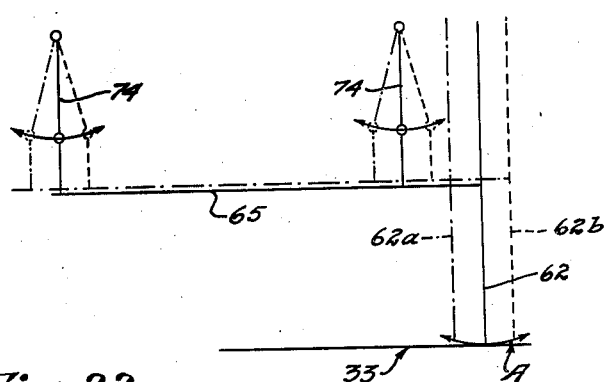
Fig. 22 is a kinematic diagram illustrating the action of the grinding wheel.

It will be evident that the links 74, frame 78 and motor 66 form a parallel linkage, of such a nature that the grinder shaft 65 and grinding wheel 62 can be swung back and forth with an arcuate motion on the fixed pivot connections 76, and that in this swinging motion the grinder shaft 65 will always remain parallel to its original position, as well as to blade 33. The relationships are diagrammatically illustrated in Fig. 22, in which the two extreme positions of the grinding wheel are illustrated in dotted lines 62a and 62b, the grinding arc through which this grinding wheel swings being indicated at A. In order that Fig. 22 may be more readily understood, it should be noted that the solid lines illustrate the positions of the various parts at the center of the grinding stroke, while the dotted lines illustrate the positions of the parts at the extreme ends of the stroke. It is the motion of the grinding wheel along arc A that comprises the grinding stroke, and it will be evident that because of the arcuate nature of this stroke, the grinding wheel moves closer to the blade 33 as the mid-point of the stroke is approached, and recedes from the blade as the ends of the stroke are approached, which motion results in grinding along the scallop of the blade, as fully set forth in my aforesaid prior patent.

Figure 6A:
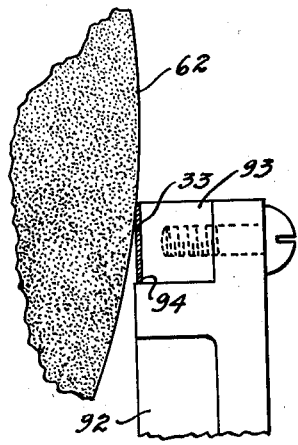
Fig. 6a is an enlargement of a fragmentary portion of Fig. 6.

As previously noted, the two grinding units 60 and 61 are offset from one another longitudinally of blade 33, so that one grinding wheel will grind one scallop of the blade while the other grinds another scallop spaced somewhat from the first. This permits a suitable blade back-up means to be provided opposite each grinding wheel. As typically illustrated in Figs. 2 and 6, a bracket 92 mounted on base plate 30 opposite the periphery of each grinding wheel supports a block 93 engaging the side of the blade opposite the grinding wheel. Bracket 92 also preferably affords a shoulder at 94 supporting the lower, unsharpened edge of the blade, as illustrated in Fig. 6. The center of the grinding wheel is located somewhat above the scalloped upper edge of the blade, in substantially the relationship illustrated in Fig. 6, and in sweeping toward and against the scalloped edge of the blade, along a grinding arc such as indicated at A in Fig. 22, the grinding wheel acts to grind a beveled edge along the scallop from one crest to the next. It will of course be readily understood that the arc and length of the griding stroke must be properly related to the distance between crests of the scalloped blade. The length of the arcuate stroke of the grinding wheel is made such as to assure clearing the blade—that is, moving slightly beyond the crests of the scallop—at each end of the grinding stroke. It is essential that the grinding wheel clear the blade at at least one end of the stroke, in order to permit feeding of the blade between grinding strokes, and it is highly preferable that the grinding wheel clear the blade at both ends of the stroke, as this is conducive to formation of the desired sharp points at the crests.

Figure 10:
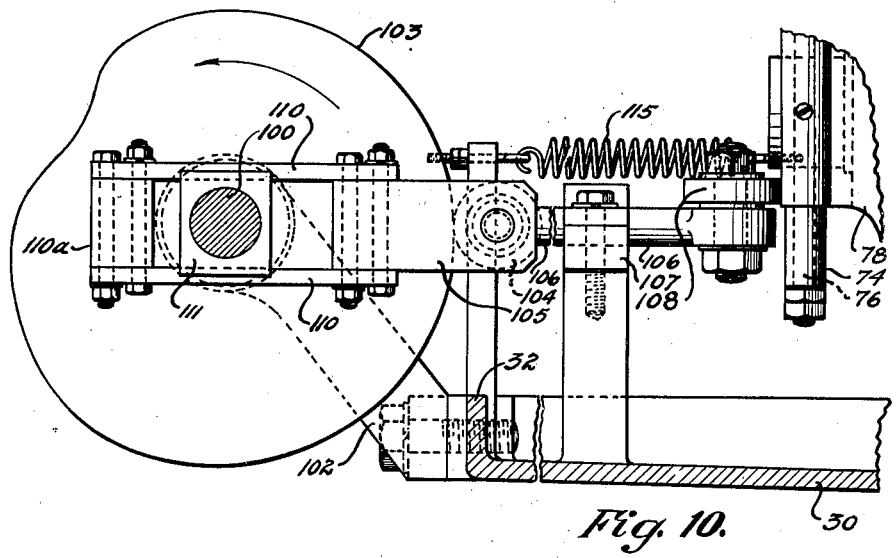
Fig. 10 is a section on line 10—10 of Fig. 2.

Any suitable means for moving the members to secure the described grinding stroke may be employed, though that illustrated in Figs. 2 and 10 is simple and preferred. A drive shaft 100, adapted to be driven by sprocket 101 and a suitable power driven chain, not illustrated, is journaled in bearing brackets 102 mounted on the left hand end of frame 30, as viewed in Fig. 2. Mounted on this drive shaft are a pair of cams 103, one for each of the grinding units, and rolling along the periphery of each of these cams 103 is a follower roller 104 rotatably mounted on a block 105 on one end of a push rod 106. This push rod 106 is furnished with a slide bearing 107 mounted on frame 30, and has at its other end a roller 108 bearing against the flat face of the aforementioned block 68 rigidly mounted on the tubular boss 67 of the motor case of the grinding unit.

Push rod block 105 is supported from shaft 100 by means of parallel straps 110 and a connecting block 110a, straps 110 slidably engaging a block 111 rotatably mounted on shaft 100, in the arrangement clearly illustrated in Figs. 2 and 10. As push rod 106 is advanced by cam 103, roller 108 in engagement with block 68 of the grinding unit causes the grinding unit to advance through its arcuate grinding stroke, roller 108 rolling on the face of block 68 to accommodate the component of movement of the grinding unit transversely of the push rod. In the particular embodiment of the invention here illustrated, the return stroke of the grinding unit is accomplished by means of a tension spring 115 connected between block 68 and a suitable bracket mounted on the flange 32 of frame 30, in the arrangement indicated in Fig. 2, this spring acting to hold block 68 in engagement with roller 108 and follower roller 104 in engagement with the periphery of cam 103 at all times, and thus constituting the motivating agent for the return grinding stroke.

A preferred form of blade indexing mechanism, of which the previously mentioned blade engaging rollers 44 and 45 form a part, will now be described. Roller 45 is positioned above and secured to a ratchet wheel 120 as by means of screws 121, and roller 45 together with ratchet wheel 120 are rotatably mounted on the shank portion 122 of a screw 123 set into a carriage 124. Ratchet wheel 120, which is intermittently advanced by pawl mechanism later to be described, is held against reverse rotation as by means of a one-way clutch 120a of the roller ratchet type placed within the hub 125 of roller 45, and the balls or rollers 125a of which engage shank 122, as illustrated in Figs. 3 and 4a. Carriage 124 has a base 126 mounted for sliding movement in a direction parallel to blade 33 on a plate 127 mounted on base 30, for instance, in the manner clearly illustrated in Fig. 3. Any suitable sliding connection may be provided between base 126 and plate 127; in the present instance, retainer strips 129 secured to base 126 provide a T-shaped slot in which plate 127 is slidably received.

Blade 33 is received between the rollers 44 and 45 in the manner clearly illustrated in Fig. 3, and in the present instance, roller 44 is adjustable toward and from roller 45 in order to adjust the frictional engagement between the rollers and the blade. Thus, in the embodiment of the invention here shown, roller 44 is mounted for rotation on the enlarged shank portion 135 of a screw 136, said screw 136 having a reduced and screwthreaded shank portion 137 extending downwardly through an adjustment block 138, the shoulder between shank portions 135 and 137 of screw 136 engaging the upper surface of block 135 and a nut 139 screwthreaded on the lower end of screw 136 being set up against the lower side of said block 138. A bearing sleeve 140 is placed between shank portion 135 of screw 136 and roller 44, and a washer 141 spaces roller 44 from the upper side of block 138. Opposite sides of block 138 are formed with grooves or ways 142, which slidably receive guide rails 143 secured to parallel ribs or flanges 144 formed on carriage 124. Block 138 and roller 44 carried thereby are thus adjustable on carriage 124 in a direction toward and from blade 33.

A thumb screw 146 screwthreaded through a strap 147 secured to the ends of rails 143 engages block 138 and adjusts the position of the latter along rails 143. Thus, the blade 33 being in position between rollers 44 and 45, the pressural engagement of the rollers on the blade may be adjusted by setting up the mounting block 138 for roller 44 by means of screw 146. Adjustment of the pressural engagement of the rollers on the blade is made sufficient that the blade may be advanced without substantial slippage when roller 45 is rotated, while at the same time the pressural engagement is not made so great as will cause undue tightness or binding of the parts.

Roller 45 is intermittently advanced by means of an intermittent pawl mechanism cooperating with the aforementioned ratchet wheel 120. A flat lever 150 is rotatably mounted on sleeve 150a between ratchet wheel 120 and the upper end of carriage portion 124a (Figs. 2, 3 and 4), and this lever 150 has pivotally mounted thereon a pawl 151 adapted for engagement with the teeth of ratchet wheel 120, in the relationship illustrated in Fig. 2, pawl 151 being furnished with a usual spring 152 holding it against ratchet wheel 120. Ratchet wheel 120 is intermittently advanced by pawl 151 through intermittent pivotal movement of lever 150 on the axis of the ratchet wheel, as will be understood. Such movement of lever 150 is, in the present instance, produced by means of a reciprocating push rod 155 mounted in a slide bearing 156 secured to base 30 and engaging the edge of lever 150 (see Fig. 2a). Push rod 155 is operated by arm 157 of a bell crank 158 pivotally mounted on base 30 at 159, the other arm 160 of said bell crank being operated by connecting rod 161 by means presently to be described. Tension spring 162 suitably anchored to the frame and connected to the swinging end of lever 150 retracts the latter, together with pawl 151, at the end of the advancing or feeding stroke thereof, while the roller ratchet clutch seen in Fig. 4a supports the ratchet wheel against reverse or return rotation.

The rearward end of connecting rod 161 is pivotally connected at 165 to a push rod 166 working in a slide bearing 167 mounted on base 30. On the rearward end of push rod 166 is a block 168 which carries a cam follower roller 169 which is engaged by the periphery of a cam 170 mounted on drive shaft 100. Push rod block 168 is indicated as supported from shaft 100 by means of parallel straps 171 and a connecting block 172, straps 171 slidably engaging opposite sides of a block 174 rotatably mounted on shaft 100, as will be understood from inspection of the drawings.

Cam 170 is so designed that at the proper time, as will later be described, push rod 166 and connecting rod 161 are advanced, thereby swinging bell crank 158 in a right-handed direction, as viewed in Fig. 2, to move push rod 155 against lever 150 and thereby swing the latter on the axis of ratchet wheel 120, this movement resulting in pawl 151 carried by lever 150 advancing ratchet wheel 120 one step ahead. Blade engaging roller 45 is thus rotated through a limited distance, and feeds blade 33 a corresponding distance ahead. The design of this blade feeding or advancing mechanism is of course such as will feed the blade a distance equal as precisely as possible to the distance between the crests of its scalloped edge. The spring 162 connected to a pawl-carrying lever 150 serves to return the linkage at the conclusion of the advance stroke, acting at all times to maintain follower roller 169 against the periphery of cam 170.

Figure 11:
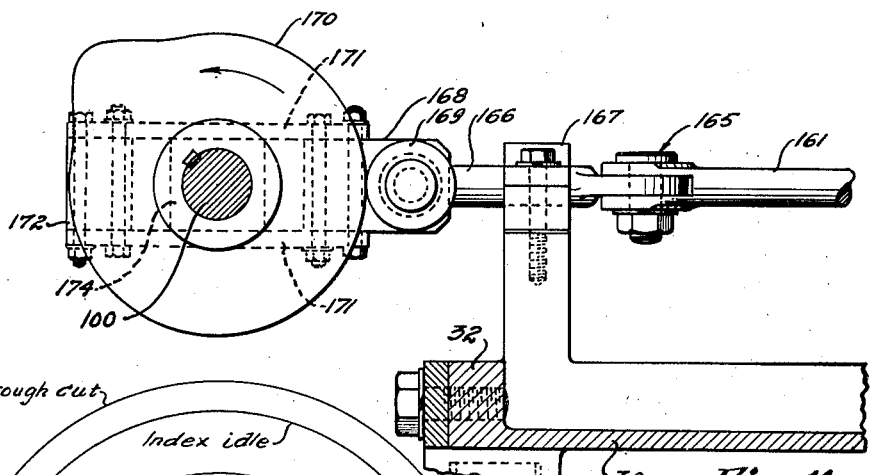
Fig. 11 is a section on line 11—11 of Fig. 2.
Figure 21:
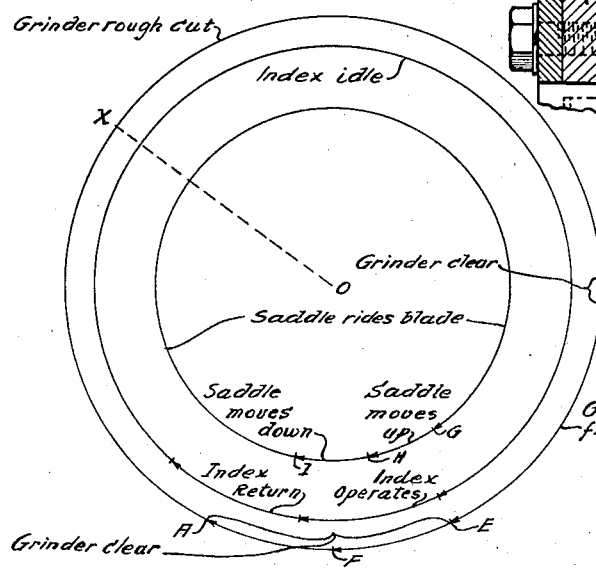
Fig. 21 is a circle diagram indicating the cycle of operations of the machine.

Reference is now directed to Fig. 21, which is a circle diagram showing the sequence of operations of the machine and the synchronous relations of its several component units or mechanism. The outside circle, ABCDEF, represents a complete cycle of operations of the two grinding units 60 and 61 as operated by cams 103, the dotted line position OX representing the position illustrated in the drawings, which is at the mid point of the advancing grinding stroke, that is, in the direction away from the cams 103, as indicated by the arrows placed alongside the grinder motors in Fig. 2. The grinder units are at the beginning of the advancing stroke at position F in Fig. 21, and are advancing to bring their respective grinding wheels into grinding engagement with the crests of the scallops about to be ground from F to A in said figure. From A to B the grinding wheels are in engagement with the blade and sweep from crest to crest of the scallops being ground. From B to C the grinding wheels move beyond or clear the crests of the scallops; at C, the grinder units reverse direction; and at D the grinder wheels again engage the blade, sweeping from crest to crest along the scallops in the reverse or return direction between positions D and E. At E the grinding wheels clear the crests of the blades, and from E to F return to the starting position. The cams 103 are preferably so shaped that the major proportion of the cycle is devoted to the grinding operation occurring from A to B, since this is the first or rough cut, and should be performed relatively slowly. The grinding wheels are clear of the blade for only a very short interval from B to C, and the return or finish cut, from D to E, is performed with substantially increased speed, as will be apparent from Fig. 21. The grinding wheels are clear of the blade following completion of the finish cut for a period represented by EA, which period is of sufficient duration to permit the indexing mechanism to advance the blade while the grinder wheels are clear. This is indicated by the second circle, GHI, the indexing mechanism operating to advance the blade between a point G corresponding with point E (the point of termination of the finish cut) and a point H which is ahead of the point at which the grinding wheels again engage the blade. The indexing mechanism then returns or retracts, with the blade remaining stationary, from H to I. The cam 170 operating the indexing mechanism is of course so shaped and so mounted on shaft 100 relatively to cams 103 as to give these relations, suitable cam shapes and relative angular positions for this purpose being illustrated in Figs. 10 and 11.

Now while the described indexing mechanism is carefully designed and adjusted to advance the blade on each actuation a distance precisely equal to the distance between crests of the scalloped blade, nevertheless, owing to the frictional nature of the drive between the blade feeding rollers and the blade, a certain inevitable slippage or creepage takes place, and even though the amount of such creepage during each advancement of the blade is of no particular moment, or not even detectible by ordinary observation, nevertheless the creepage that accumulates for several feet of travel of the blade may amount to several thousandths of an inch, which is greater than a maximum tolerance. The present invention compensates for such cumulative creepage by the provision of means cooperable with the scallops of the blade and designed to detect any displacement of the scallops from their proper predetermined position with relation to the grinding means for proper grinding action by the latter with the particular scallop then in register therewith, in combination with means for effecting relative movement between the blade and grinding means to compensate any displacement that may thus be detected. In a preferred form of the inention this relative compensating movement between blade and grinding means is accomplished by a suitable movement of the blade engaging rollers 44 and 45 by or between which the blade is held, and while it is within the broad scope of my invention to move said rollers in any fashion or manner to secure a longitudinal compensating movement of the blade, there is here illustrated a preferred form of the invention in which such movement of the blade is secured by a movement of the carriage 126 on which the blade engaging rollers 44 and 45 are mounted in a direction longitudinally of the blade, in such manner that said rollers bodily move in a corresponding direction, and hence move the blade along with them as will now be described in detail.

Figure 8:
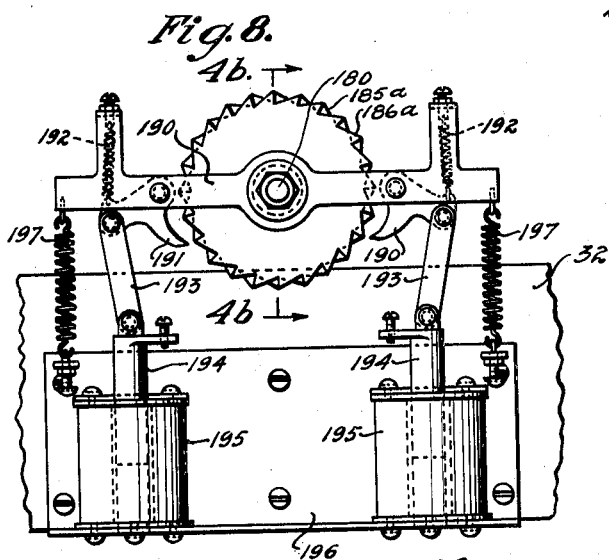
Fig. 8 is a view taken as indicated by line 8—8 of Figs. 1 and 2.

A lead screw 180 journaled in a bearing 181 formed at the end of base 30 opposite carriage 124 has screwthreaded engagement with the carriage at 182, lead screw 180 being confined against longitudinal movement with reference to bearing 181 by means of a flange 183 and a collar 184. Tightly mounted on the extremity of lead screw 180, forwardly or outside of flange 183, are a pair of ratchet wheels 185 and 186, having oppositely directed teeth 185a and 186a, respectively. Cooperable with ratchet wheels 185 and 186 is suitable pawl mechanism adapted to effect rotation of lead screw 180, and therefore longitudinal travel of carriage 124, in either direction. One simple example of such pawl mechanism is illustrated in the drawings, and embodies a beam 190 pivotally mounted at the center on the end of lead screw 180, forwardly of ratchet wheels 185 and 186, and a pair of pawls 190 and 191 pivotally mounted on the two arms of beam 190 in positions for operative engagement with ratchet wheels 185 and 186, respectively. These pawls are held normally out of engagement with the ratchet wheels by means of tension springs 192, and they are actuated to engage and advance the ratchet wheels by means of links 193 connecting them with the plungers 194 of solenoids 195, the latter being mounted on a supporting bracket 196 secured to the end of base frame 30, all as clearly illustrated in Figs. 2, 4 and 8. Tension springs 197 connected between opposite ends of beam 190 and bracket 196 yieldingly hold beam 190 in a horizontal position, with solenoid plungers 194 supported in elevated position by means of springs 192. Energization of either of solenoids 195 causes the corresponding solenoid plunger 194 to be moved in a downward direction, link 193 thereupon acting against spring 192 to move pawl 191 into engagement with the corresponding ratchet wheel, after which further downward movement of plunger 194 and link 193 causes beam 190 to swing downwardly and thereby advance the ratchet wheel, This results in a certain rotation of lead screw 180, and a small longitudinal adjustment of carriage 124, and therefore of blade 33, the blade engaging rollers 44 and 45 mounted on carriage 124 moving the portion of the blade clamped between them either forwardly or rearwardly as the case may be. If the adjustment movement is in a direction to move the blade in a forward direction, the blade may either slide forwardly a corresponding distance between the blade tensioning blocks 51 at the other end of the tensioning section of the blade, or if such slippage does not occur, bell crank 46 may tilt slightly forwardly against spring 55. If the adjustment movement is in the reverse direction, the bell crank 46 moves under the actuation of spring 55 to take up the slack and maintain the blade tension. Any play in the adjustment means due to back lash in the screwthreads at 182 is taken care of owing to the tensioning of the blade by tensioning means 46. To supplement this action, I may place a compression spring 197a around lead screw 180 between collar 184 and carriage 124, this spring acting effectively to remove any undesirable play between the lead screw and carriage 124.

Means are provided cooperable with the scallops of the blade for energizing one or the other of the two solenoids 195 to cause adjustment in the longitudinal position of the blade relative to the grinding wheels whenever the scallops of the blade creep appreciably from a position of registration with the grinding arcs of the grinding wheels. As one typical embodiment of such means, I show in the drawings a mechanical feeler member 200 cooperable with successive crests of the scalloped blade, being in this case in the nature of a saddle which engages and rides the blade edge on opposite sides of successive crests, and detects any departure of a crest of the blade from its predetermined proper position with relation to the grinding arcs.

In the present embodiment of the invention, the saddle element 200 is in the form of a disk 201 having a bore 202 of smaller diameter sunk in the front face thereof, the circles of the bore 202 and of disk 201 being tangent at the bottom, and the stock of the disk being cut away at the bottom to form two horns or feeler elements 203, all as will readily be understood from an inspection of Figs. 13 and 14. These feeler elements 203 are adapted to be let down and to engage the edge of the blade on opposite sides of its crest, as in Fig. 13, preferably being rounded over somewhat so as to avoid any liability of nicking the edge of the blade. Saddle 200 is tightly mounted on one end of a stud 205 which is pivotally mounted in the swinging end of the arm 206 of a beam 207, the latter being pivotally supported at 208 on suitable supporting means 209 mounted on frame 30. As will be seen in Fig. 12, saddle 200 engages blade 33 between the grinding units and blade tensioning means 46, and therefore engages the blade prior to operation of the grinding means thereon, though within the tensioned length of the blade. The other arm 210 of beam 207 carries a roller 211 which is intermittently engaged by a cam 212 mounted on drive shaft 100. Arm 206 is shown as counter-weighted, as at 206a, so as to allow saddle 200 to rest on the blade. At such time, the roller 211 is out of engagement. Cam 212 is designed to engage roller 211 to lift arm 206 and thereby disengage saddle 200 from the blade while the indexing mechanism is in operation, and then immediately to allow arm 206 to lower to bring saddle 200 back into engagement with the next crest of the blade. A spring 213 may preferably be employed to yieldingly oppose movement of the beam by the cam, and to assure prompt return of the beam to a position in which the saddle engages the blade. The timing is indicated by the diagram of Fig. 21, the saddle being lifted between points G and H, in a manner to clear the blade before the indexing mechanism operates, and moving down between points H and I, in a manner such that the blade is not engaged until the indexing mechanism has completed the blade feeding operation.

Rigidly mounted on saddle stud 205, on the opposite side of arm 206 from said saddle, is a depending arm 215 that has at its lower end two oppositely facing electrical contacts 216 and 217. These contacts 216 and 217 are adapted to make with contacts 218 and 219, respectively, as arm 215 swings to one side or the other of its normal vertical position. Arm 215 pivotally connected with and suspended from the arm 206 of beam 207 normally positions saddle 200 with its two feeler elements 203 in a precisely level relationship. If when the saddle is lowered into engagement with the blade as aforesaid, the crest of the blade is accurately alined with the center of the saddle, or in other words, with the axis of saddle stud 205 (under which conditions two scallops of the blade will coincide accurately with the grinding arcs A of the two grinding units) feeler elements 203 will engage the edge of the blade on opposite sides of the crest simultaneously, and the saddle will not be rocked to one side or the other, so that arm 215 hangs vertically, with both contacts 216 and 217 spaced from their respective mating contacts 218 and 219. If, on the other hand, the crest of the blade should be displaced slightly to one side of the axis of saddle 200, then one or the other of feeler elements 203 will engage the blade first, thereby causing the saddle to rock slightly on the axis of stud 205. This results in swinging of arm 215 to one side of vertical, so as to cause contact to be made between contacts 217 and 219, or 216 and 218, depending upon the direction of swing of arm 215, and therefore upon the direction in which the crest of the blade is offset from the pivotal axis of the saddle. Prior to description of the circuits closed by the operation described, it may be noted that Fig. 12 shows contacts 218 and 219 to be supported within an insulation contact housing or block 220 mounted on the underside of base 30, electrical leads 221 and 222 being connected to contacts 218 and 219, respectively. An insulation tube 225 placed around arm 215 and a guard 226 mounted on arm 215 over the opening in the upper end of tube 225 serve to guard against grindings entering within contact housing 220.

Figure 19:
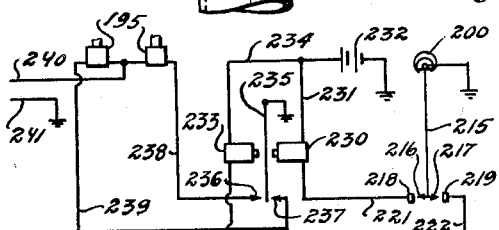
Fig. 19 is a diagram of an electrical circuit.

Fig. 19 shows diagrammatically a typical electrical circuit whereby arm 215 controls energization of the previously described solenoids 195. Lead 221 connected to contact 218 goes to a relay winding 230, the circuit continuing via lead 231 and battery 232 to ground. Arm 215 and saddle 200 are grounded to the frame of the machine, as indicated in Fig. 19. Lead 222 similarly connects to relay winding 233, the circuit continuing via lead 234 and battery 232 to ground. Relay windings 230 and 233 control operation of relay armature 235, the latter being adapted to connect either of contacts 236 or 237 to ground as winding 233 or 230, respectively, is energized. One of solenoids 195 is connected by a lead 238 to contact 236, while the other of solenoids 195 is connected by a lead 239 to contact 237. A suitable source of electrical current 240, 241 is connected to the other side of each of the two solenoids 195, and to ground, as diagrammed.

It may now be understood that whenever the crest of the blade engaged by saddle 200 is displaced in one direction or the other from the pivot axis of the saddle, which will mean a corresponding displacement of the blade scallops then to be ground with reference to the grinding arcs of the grinding units, the engagement of the saddle with the blade will cause the saddle to be rocked to one side or the other, depending upon which of the two feeler elements 203 of the saddle first engages the blade. This causes the depending arm 215 connected with the saddle and suspended from arm 206 to swing to one side or the other, as the case may be. Because of the considerable length of the arm 215, even a very slight displacement of the crest will in this way cause contact to be made between either contacts 216 and 218, or contacts 217 and 219, depending upon the direction of swing. This results in closing a circuit energizing either relay winding 230 or relay winding 233, which in turn closes a circuit through one or the other of the two solenoids 195. As previously described, energization of a solenoid 195 causes operation of pawl and ratchet mechanism to rotate lead screw 180 through a few degrees of angular rotation, thereby causing translation of index mechanism carriage 124 and hence longitudinal adjustment of the blade position. Connections are of course so made that this longitudinal adjustment of the blade is in a proper direction to correct the displacement of the blade crest from the pivot axis of saddle 200 which was responsible for closure of the circuits performing or controlling the described longitudinal blade adjustment. The amount of creepage of the blade, or in other words the amount of displacement of a blade crest from the pivotal axis of saddle 200, which enters for each actuation of the indexing mechanism is very slight, and may be only a small fraction of a thousandth of an inch. Depending upon the accuracy of operation of the indexing mechanism, several actuations of the latter may take place before sufficient creepage of the blade has accumulated to result in sufficient swing of arm 215 to set the compensating mechanism into operation. Once arm 215 has swung sufficiently to cause contact to be made at 216, 218 or 217, 219, however, the ratchet mechanism will be operated to adjust the longitudinal position of the blade in such a direction as to compensate the blade creepage which has occurred. One operation of the ratchet mechanism may be sufficient to move the blade a distance such as will cause the arm 215 to open the electrical circuit causing energization of the ratchet solenoids, or it may be that several such operations, taking place as the saddle engages the blade at successive crests, may be required to accomplish the necessary longitudinal adjustment of the blade, this of course depending upon the creepage permitted by the indexing mechanism, upon the angular rotation of lead screw 180 for each actuation of the ratchet mechanism, and upon the pitch of lead screw 180. The compensating mechanism is sufficiently sensitive that the inevitable more or less constant blade creepage is never permitted to accumulate to a sufficient extent to interfere with proper grinding of the scallops, being compensated by translation of the indexing rollers and blade before the displacement exceeds an allowable tolerance.

Figure 9:
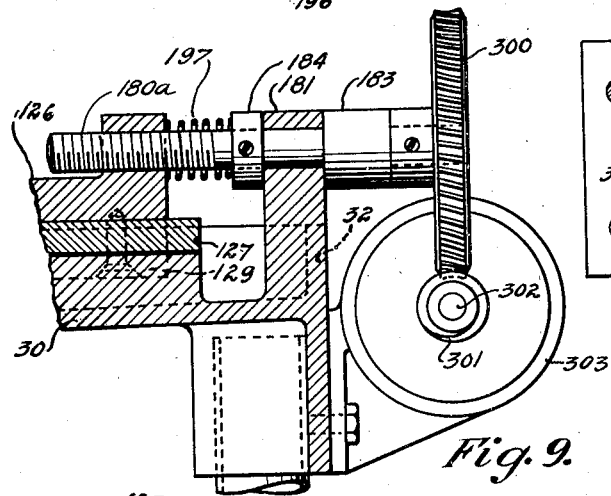
Fig. 9 is a view similar to a portion of Fig. 4, but showing a modification.
Figure 20:
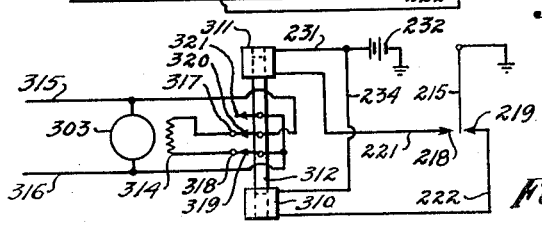
Fig. 20 is a diagram of an electrical modified circuit adapted for use with the modified form of the invention indicated in Fig. 9.

Figs. 9 and 20 show a modification, in which a reversible electric drive motor is substituted for the pawl and ratchet mechanism of the blade-creepage compensating means, Fig. 9 being a view similar to a portion of Fig. 4 but showing the substitution of the electrical drive motor, and Fig. 20 being a typical wiring circuit suitable for use with such motor.

In Fig. 9, the lead screw 180a has mounted thereon a worm wheel 300 driven by a worm 301 on the shaft 302 of a reversible electric drive motor 303 mounted on the frame 30 of the machine, which may otherwise be the same as the embodiment previously described.

In Fig. 20, which shows the wiring circuit for the modification of Fig. 9, the grounded saddle-carrying arm is again indicated at 215, and the circuits closed by said arm are again indicated by numerals 221, 231 and 222, 234, said circuits including source of current 232, which is grounded as indicated. These portions of the circuit are the same as in Fig. 19. In place of the solenoids 195 of Fig. 19, however, circuits 221, 231 and 222, 234 are diagrammatically indicated as including opposed solenoids 310 and 311, respectively, within which work a movable core member 312. The motor 303 is indicated in Fig. 20 as being of a shunt type, with a reversible shunt field 314, the motor being supplied with electrical current from a suitable source 315, 316. Shunt winding 314 is connected to two stationary electrical contacts 317 and 318, while movable core member 312 carries three electrical contacts 319, 320 and 321. Of the latter, the two outside contacts 319 and 321 are connected together, and are also connected to one side 316 of the source of current. Middle contact 320 is connected to the other side 315 of the source of current. With solenoid 311 energized, which occurs when saddle arm 215 closes circuit 221, 231, core member 312 moves to bring contacts 319 and 320 into contact with contacts 318 and 317, respectively, thus connecting winding 314 in shunt with the armature of motor 303 and causing motor 303 to run in one direction. When solenoid 310 is then subsequently energized, upon saddle arm 215 closing circuit 222, 234, core member 312 moves to bring contacts 320 and 321 into contact with contacts 318 and 317, respectively, thereby connecting winding 314 in a reverse sense across current supply source 315, 316. The motor then drives in the reverse direction. Electric motor 303 thus runs in one direction or the other, depending upon arm 215 being swung to one side or the other as the crest of the scallop straddled by the saddle element 200 becomes displaced in one direction or the other from the axis of the saddle. Such operation of the motor rotates lead screw 180a through gears 301 and 300, thereby effecting a compensating adjustment of the blade as before. It will be evident that motor 303 will run until the crest of the blade straddled by the saddle element has been moved toward vertical alinement with the axis of the saddle element sufficiently to break the circuit being held closed by the arm 215.

Figure 25:
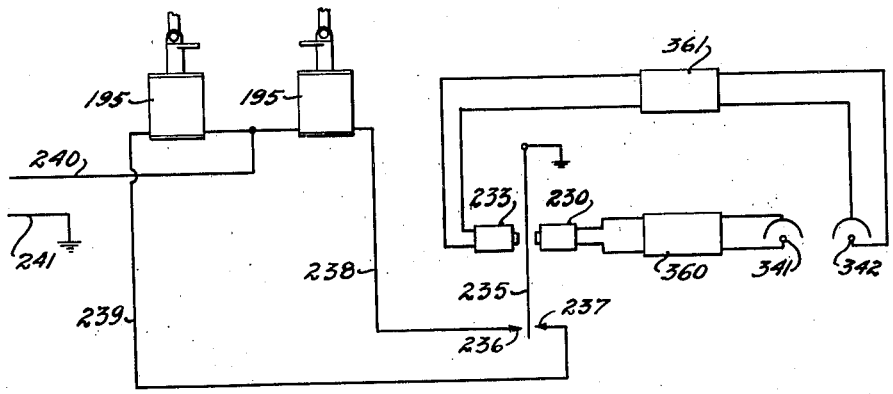
Fig. 25 is a diagram of an electrical circuit suitable for the modification of Figs. 17 and 18.
Figure 17:
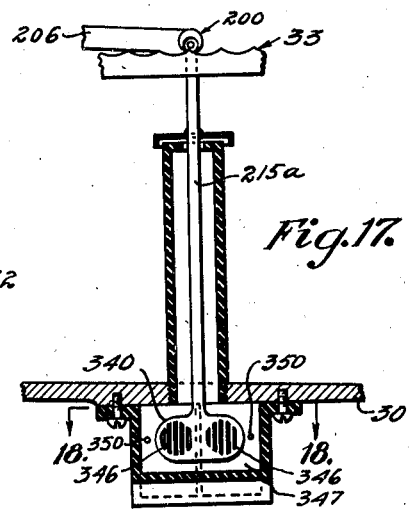
Fig. 17 is a view similar to a portion of Fig. 12 but showing a modification.
Figure 18:
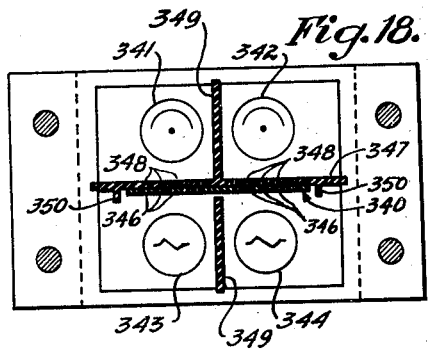
Fig. 18 is a section taken on line 18—18 of Fig. 17.

Figs. 17, 18 and 25 illustrate a further modification, in accordance with which the saddle operated arm, in this instance designated by numeral 215a, controls the illumination of a pair of photo-electric cells, which in turn initiate operation of the mechanism which adjusts the longitudinal position of the blade. Thus, arm 215a has on its lower end a shutter element 340, which controls the illumination of a pair of photo-electric cells 341 and 342 by a pair of illuminants 343 and 344, respectively. The arrangement is made such that when arm 215 is hanging in vertical position, with the crest of the blade straddled by the saddle in close vertical alinement with the saddle axis, the shutter element 340 intercepts all light travelling toward the photo-electric cells, from both illuminants 343 and 344, but when arm 215a swings in one direction or the other, as the crest of the blade becomes displaced in one direction or the other, light from one or the other illuminants is allowed to reach its corresponding photo-electric cell. In the specific embodiment here illustrated, this is accomplished by providing shutter element 340 with a plurality of vertical light passing apertures or slots 346, and by providing an aperture plate 347 having a corresponding plurality of light apertures or slots 348. The illuminants 343 and 344 and the photo-cells 341 and 342 are separated by light shields 349. The set of light apertures 348 on one side of said shields are so placed that a very small movement of shutter 340 in one direction brings the corresponding shutter apertures 346 into register with said apertures 348, while the set of apertures 348 on the other side of light shields 349 are so placed that a very small movement of shutter element 340 in the opposite direction brings the corresponding shutter apertures 346 into register with the last mentioned set of apertures 348. Shutter 340 is limited in movement in each direction to an amount of travel which will accomplish the described registration of apertures on one side of the light shields 349 without causing registry of the light apertures on the other side of said shields by means of stops 350, as will be understood. Thus, in the arrangement detailed in Figs. 17 and 18, movement of arm 215a and shutter 340 toward the right will cause registration of the apertures 346 and 348 on the left-hand side of shields 349, and therefore illumination of photo-cell 341 by illuminant 343. Movement of arm 215a and shutter 340 toward the left, on the other hand, effects registration of the apertures 346 and 348 on the right-hand side of shields 349, and therefore illumination of photo-cell 342 by illuminant 344.

Illumination of photo-cells 341 or 342 in the manner described in the preceding paragraph causes operation of the compensating mechanism through an electrical circuit, one example of which is diagrammed in Fig. 25, which will be seen to be the same as Fig. 9, except for the means employed for energizing relay windings 230 and 233. It will be understood that any suitable means will be provided whereby relay winding 230 is energized when light impinges on photo-cell 341, and whereby relay winding 233 is energized when light impinges on photo-cell 342. Thus, as a typical example, the outputs of photo-cells 341 and 342 may be conducted to conventional vacuum tube amplifiers, diagrammatically indicated at 360 and 361, respectively, the outputs from which are connected, respectively to relay windings 230 and 233, and it will be understood that the output of either of said photo-cells resulting from light impingement thereon will cause its corresponding amplifier to deliver sufficient current to effect operation of the corresponding relay. Operation of either of relays 230 and 233 effects energization of the corresponding ratchet operating solenoid 195, thereby effecting compensating adjustment of the blade in the manner detailed in connection with the first described form of the invention.

It will be understood that the several forms of the invention herein described and illustrated are merely illustrative of and not restrictive on the many forms which my invention may assume in practice, and it it therefore to be understood that numerous changes in design, structure and arrangement may be made without departing from the spirit and scope of the invention or of the appended claims.

I claim:

1. In a machine for grinding a scalloped, beveled cutting edge on a blade, the combination of a frame, frictional blade feeding means supported by said frame and adapted for frictional driving engagement with the blade, means on said frame for intermittently operating said blade feeding means to advance the blade through a distance equal substantially to the distance between crests of the scalloped blade, a grinding means mounted on said frame and operable to grind a scallop of the blade when the blade is positioned with its scallops in a predetermined longitudinal position with relation to said grinding means, blade creepage compensating means for moving the blade in a longitudinal direction, and means cooperable with the scallops of the blade for controlling operation of said compensating means.

2. In a machine for grinding a scalloped, beveled cutting edge on a blade, the combination of a frame, frictional blade feeding means supported by said frame and adapted for fritional driving engagement with the blade, means on said frame for intermittently operating said blade feeding means to advance the blade through a distance equal substantially to the distance between crests of the scalloped blade, a grinding means mounted on said frame and operable to grind a scallop of the blade when the blade is positioned with its scallops in a predetermined longitudinal position with relation to said grinding means, blade creepage compensating means for moving said blade feeding means with relation to said frame in a manner to adjust the position of the blade in a longitudinal direction, and means cooperable with the scallops of the blade for controlling operation of said compensating means.

3. In a machine for grinding a scalloped, beveled cutting edge on a blade, the combination of a frame, frictional blade feeding means supported by said frame and adapted for frictional driving engagement with the blade, means on said frame for intermittently operating said blade feeding means to advance the blade through a distance equal substantially to the distance between crests of the scalloped blade, a grinding means mounted on said frame and operable to grind a scallop of the blade when the blade is positioned with its scallops in a predetermined longitudinal position with relation to said grinding means, blade creepage compensating means for effecting relative movement in a direction longitudinally of the blade between said frictional blade feeding means and said grinding means, and means cooperable with the scallops of the blade for controlling operation of said compensating means.

4. In a machine for grinding a scalloped, beveled cutting edge on a blade, the combination of a frame, frictional blade feeding means supported by said frame and adapted for frictional driving engagement with the blade, means on said frame for intermittently operating said blade feeding means to advance the blade through a distance equal substantially to the distance between crests of the scalloped blade, tensioning means frictionally engageable with the blade for tensioning a length of the blade between said tensioning means and the said blade feeding means, a grinding means mounted on said frame and operable to grind a scallop of the blade within said tensioned length of the blade when the blade is positioned with its scallops in a predetermined longitudinal position with relation to said grinding means, blade creepage compensating means for effecting relative movement along a direction line longitudinally of the blade between said blade feeding means and said grinding means, in a manner to adjust the longitudinal position of the blade with relation to said grinding means, and means cooperable with the scallops of the blade for controlling operation of said compensating means.

5. In a machine for grinding a scalloped, beveled cutting edge on a blade, the combination of a frame, frictional blade feeding means supported by said frame and adapted for frictional driving engagement with the blade, means on said frame for intermittently operating said blade feeding means to advance the blade through a distance equal substantially to the distance between crests of the scalloped blade, tensioning means frictionally engageable with the blade for tensioning a length of the blade between said tensioning means and the said blade feeding means, a grinding means mounted on said frame and operable to grind a scallop of the blade within said tensioned length of the blade when the blade is positioned with its scallops in a predetermined longitudinal position with relation to said grinding means, blade creepage compensating means for moving said blade feeding means in reverse directions in a manner to move the blade longitudinally in either direction with relation to said grinding means, and means cooperable with the scallops of the blade for detecting displacement of the scallops from said predetermined position with relation to said grinding means and to effect operation of said compensating means to move the blade in a direction to correct such detected displacement.

6. In a machine for grinding a scalloped, beveled cutting edge on a blade, the combination of a frame, frictional blade feeding means supported by said frame and adapted for frictional driving engagement with the blade, means on said frame for intermittently operating said blade feeding means to advance the blade through a distance equal substantially to the distance between crests of the scalloped blade, tensioning means frictionally engageable with the blade for tensioning a length of the blade between said tensioning means and the said blade feeding means, a grinding means mounted on said frame and operable to grind a scallop of the blade within said tensioned length of the blade when the blade is positioned with its scallops in a predetermined longitudinal position with relation to said grinding means, blade creepage compensating means for moving said blade feeding means in reverse directions in a manner to move the blade longitudinally in either direction with relation to said grinding means, a feeler member engageable with the blade edge on opposite sides of successive crests between scallops for detecting displacement of the scallops from said predetermined position with relation to said grinding means, and means controlled by said feeler member for effecting operation of said compensating means to move the blade in a direction to correct such detected displacement.

7. In a machine for grinding a scalloped, beveled cutting edge on a blade, the combination of a frame, frictional blade feeding means supported by said frame and adapted for frictional driving engagement with the blade, means on said frame for intermittently operating said blade feeding means to advance the blade through a distance equal substantially to the distance between crests of the scalloped blade, tensioning means frictionally engageable with the blade for tensioning a length of the blade between said tensioning means and the said blade feeding means, a grinding means mounted on said frame and operable to grind a scallop of the blade within said tensioned length of the blade when the blade is positioned with its scallops in a predetermined longitudinal position with relation to said grinding means, blade creepage compensating means for bodily moving said blade feeding means relatively to said frame in a direction longitudinally of said tensioned length of blade in a manner to adjust the longitudinal position of the blade with relation to said grinding means, and means cooperable with the scallops of the blade for controlling operation of said compensating means.

8. In a machine for grinding a scalloped, beveled cutting edge on a blade, the combination of a frame, a blade feeding roller adapted for frictional driving engagement with the blade to be ground, means for supporting the blade in frictional driving contact with said roller, means for tensioning a length of the blade adjacent to said feeding roller, roller supporting means on said frame supporting said roller for rotation on its axis and for bodily movement with relation to said frame in a direction longitudinally of the blade, means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means for bodily moving said roller in directions longitudinally of the blade in a manner to adjust the longitudinal position of the blade with relation to said grinding means, and means cooperable with the scallops of the blade for controlling operation of said compensating means.

9. In a machine for grinding a scalloped, beveled cutting edge on a blade, the combination of a frame, a blade feeding roller adapted for frictional driving engagement with the blade to be ground, a roller for supporting the blade in frictional driving contact with said feeding roller, means for tensioning a length of the blade adjacent to said feeding roller, a carriage for said rollers mounted on said frame for movement longitudinally of the blade, said rollers being rotatable on their axes on said carriage, means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means including means for moving said roller carriage on said frame in a direction longitudinally of the blade, and means cooperable with the scallops of the blade for controlling movement of said roller carriage.

10. In a machine for grinding a scalloped, beveled cutting edge on a blade, the combination of a frame, a blade feeding roller adapted for frictional driving engagement with the blade to be ground, a roller for supporting the blade in frictional driving contact with said feeding roller, means for tensioning a length of the blade adjacent to said feeding roller, a carriage for said roller mounted on said frame for movement longitudinally of the blade, said rollers being rotatable on their axes on said carriage, means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means including means for moving said roller carriage on said frame in a direction longitudinally of the blade, and means cooperable with the scallops of the blade for detecting displacement of the scallops from said predetermined position with relation to said grinding means and to effect movement of said roller carriage in a direction to correct such detected displacement.

11. In a machine for grinding a scalloped, beveled cutting edge on a blade, the combination of a frame, a blade feeding roller adapted for frictional driving engagement with the blade to be ground, a roller for supporting the blade in frictional driving contact with said feeding roller, means for tensioning a length of the blade adjacent to said feeding roller, a carriage for said rollers mounted on said frame for movement longitudinally of the blade, said rollers being rotatable on their axes on said carriage, means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means including a feeler member engageable with the blade edge on opposite sides of successive crests between scallops at times between times of feeding of the blade for detecting displacement of the scallops from said predetermined position with relation to said grinding means, and means controlled by said feeler member for moving said roller carriage in a direction to compensate the displacement so detected.

12. In a machine for grinding a scalloped, beveled cutting edge on a blade, the combination of a frame, a blade feeding roller adapted for frictional driving engagement with the blade to be ground, a roller for supporting the blade in frictional driving contact with said feeding roller, means for tensioning a length of the blade adjacent to said feeding roller, a carriage for said rollers mounted on said frame for movement longitudinally of the blade, said rollers being rotatable on their axes on said carriage, means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means including electrically powered means for moving said roller carriage in either direction longitudinally of the blade, and means cooperable with the scallops of the blade between times of feeding of the blade and including electrical energizing circuiting for said electrically powered means for detecting displacements in either direction of the scallops from said predetermined position and for energizing said electrically powered means to move the roller carriage in a direction to compensate displacements detected.

13. In a machine for grinding a scalloped, beveled cutting edge on a blade, the combination of a frame, a blade feeding roller adapted for frictional driving engagement with the blade to be ground, a roller for supporting the blade in frictional driving contact with said feeding roller, means for tensioning a length of the blade adjacent to said feeding roller, a carriage for said rollers mounted on said frame for movement longitudinally of the blade, said rollers being rotatable on their axes on said carriage, means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means including electrically powered means for moving said roller carriage in either direction longitudinally of the blade, separate electrical circuits adapted to be switched to cause operation of said electrically powered means to move said roller carriage in opposite directions, and means cooperable with the scallops of the blade between times of feeding of the blade for detecting displacements in either direction of the scallops from said predetermined position and for switching said electrical circuits to cause operation of said electrically powered means to move said roller carriage in a direction to compensate the displacement detected.

14. In a machine for grinding a scalloped, beveled cutting edge on a blade, the combination of a frame, a blade feeding roller adapted for frictional driving engagement with the blade to be ground, a roller for supporting the blade in frictional driving contact with said feeding roller, means for tensioning a length of the blade adjacent to said feeding roller, a carriage for said rollers mounted on said frame for movement longitudinally of the blade, said rollers being rotatable on their axes on said carriage, means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means including electrically powered means for moving said roller carriage in either direction longitudinally of the blade, separate normally open electrical circuits adapted when energized to effect operation of said electrically powered means to move said roller carriage in opposite directions, and means cooperable with the scallops of the blade between times of feeding of the blade for closing one or the other of said circuits as the scallops of the blade become displaced in one direction or the other from said predetermined position in such a manner that said electrically powered means is operated to move said roller carriage in a direction to correct such displacements of the blade.

15. In a machine for grinding a scalloped, beveled cutting edge on a blade, the combination of a frame, a blade feeding roller adapted for frictional driving engagement with the blade to be ground, a roller for supporting the blade in frictional driving contact with said feeding roller, means for tensioning a length of the blade adjacent to said feeding roller, a carriage for said rollers mounted on said frame for movement longitudinally of the blade, said rollers being rotatable on their axes on said carriage, means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means including a feeler member intermittently engageable with the scalloped blade edge, at times while the blade feeding roller is stationary, said feeler member being movable by the blade edge in accordance with displacement of the scallops of the blade from said predetermined position, electrically powered means for moving said roller carriage in reverse directions, and electrical circuiting for energizing said electrically powered means controlled by movement of said feeler member by its engagement with the scalloped blade edge.

16. In a machine for grinding a scalloped, beveled cutting edge on a blade, the combination of a frame, a blade feeding roller adapted for frictional driving engagement with the blade to be ground, a roller for supporting the blade in frictional driving contact with said feeding roller, means for tensioning a length of the blade adjacent to said feeding roller, a carriage for said rollers mounted on said frame for movement longitudinally of the blade, said rollers being rotatable on their axes on said carriage, means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means including a pivoted saddle member intermittently engageable with the blade edge on opposite sides of successive crests between scallops at times while the blade feeding roller is stationary, said saddle member being movable on its pivot axis in opposite directions as it engages the blade edge in accordance with displacement of the blade scallops in one direction or the other from said predetermined position, electrically powered means for moving said roller carriage in reverse directions, and electrical circuiting for energizing said electrically powered means controlled by said pivotal movement of said saddle element.

17. In a machine for grinding a scalloped, beveled cutting edge on a blade, the combination of a frame, a blade feeding roller adapted for frictional driving engagement with the blade to be ground, a roller for supporting the blade in frictional driving contact with said feeding roller, means for tensioning a length of the blade adjacent to said feeding roller, a carriage for said rollers mounted on said frame for movement longitudinally of the blade, said rollers being rotatable on their axes on said carriage, pawl and ratchet means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means including means for moving said roller carriage on said frame in a direction longitudinally of the blade, and means cooperable with the scallops of the blade for controlling movement of said roller carriage.

18. In a machine for grinding a scalloped, beveled cutting edge on a blade, the combination of a frame, a blade feeding roller adapted for frictional driving engagement with the blade to be ground, means for supporting the blade in frictional driving contact with said feeding roller, means for tensioning a length of the blade adjacent to said feeding roller, a carriage for said roller mounted on said frame for movement longitudinally of the blade, said roller being rotatable on its axis on said carriage, means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means including, a lead screw for driving said roller carriage, electrically powered means for rotating said lead screw in reverse directions, and means cooperable with the scallops of the blade between times of feeding of the blade and including electrical energizing circuiting for said electrically powered means for detecting displacements in either direction of the scallops from said predetermined position and for energizing said electrically powered means to rotate said lead screw in a direction to compensate the displacement detected.

19. In a machine for grinding a scalloped, beveled cutting edge on a blade, the combination of a frame, frictional blade feeding means supported by said frame and adapted for frictional driving engagement with the blade, means on said frame for intermittently operating said blade feeding means to advance the blade through a distance equal substantially to the distance between crests of the scalloped blade, a grinding means mounted on said frame and operable to grind a scallop of the blade when the blade is positioned with its scallops in a predetermined longitudinal position with relation to said grinding means, adjustment means for effecting relative movement along a direction line longitudinally of the blade between the blade and the grinding means, and means cooperable with the scallops of the blade for detecting displacement of the scallops from said predetermined position with relation to the grinding means and for causing operation of said adjustment means in a manner to correct the detected displacement.

20. In a machine for grinding a scalloped, beveled cutting edge on a blade, the combination of a frame, frictional blade feeding means supported by said frame and adapted for frictional driving engagement with the blade, means on said frame for intermittently operating said blade feeding means to advance the blade through a distance equal substantially to the distance between crests of the scalloped blade, tensioning means frictionally engageable with the blade for tensioning a length of the blade between said tensioning means and the said blade feeding means, a grinding means mounted on said frame and operable to grind a scallop of the blade within said tensioned section of the blade when the blade is positioned with its scallops in a predetermined longitudinal position with relation to said grinding means, adjustment means for effecting relative movement along a direction line longitudinally of the blade between the blade and the grinding means, and means cooperable with the scallops of the blade for detecting displacement of the scallops from said predetermined position with relation to the grinding means and for causing operation of said adjustment means in a manner to correct the detected displacement.

21. In a machine for grinding a scalloped, beveled cutting edge on a blade, the combination of a frame, a blade feeding roller adapted for frictional driving engagement with the blade to be ground, means for supporting the blade in frictional driving contact with said roller, means for tensioning a length of the blade adjacent to said feeding roller, roller supporting means on said frame supporting said roller for rotation on its axis and for bodily movement with relation to said frame in a direction longitudinally of the blade, means for intermittently rotating said feeding roller through an angle such as will feed the blade ahead a distance substantially equal to the distance between blade crests, a grinding means mounted on said frame and operable to grind a scallop of the tensioned length of the blade when the blade is positioned with its scallops in a predetermined longitudinal position with relation to said grinding means, blade creepage compensating means for bodily moving said roller in reverse directions longitudinally of the blade in a manner to adjust the longitudinal position of the blade with relation to said grinding means, and means cooperable with the scallops of the blade for detecting displacement of the scallops from said predetermined position with relation to the grinding means and for causing operation of said compensating means in a direction to correct the detected displacement.

22. In a machine for grinding a scalloped, beveled cutting edge on a blade, the combination of a frame, frictional blade feeding means supported by said frame and adapted for frictional driving engagement with the blade, means on said frame for intermittently operating said blade feeding means to advance the blade through a distance equal substantially to the distance between crests of the scalloped blade, a grinding means mounted on said frame and operable to grind a scallop of the blade when the blade is positioned with its scallops in a predetermined longitudinal position with relation to said grinding means, adjustment means for effecting relative movement along a direction line longitudinally of the blade between the blade and the grinding means, a feeler member engageable with the blade edge on opposite sides of successive crests between times of feeding of the blade, said feeler member being adapted to assume different positions by virtue of its engagement with the blade edge depending upon the degree and direction of displacement of the blade scallops from said predetermined position, and means controlled by the positioning of said feeler member by the blade edge for causing operation of said adjustment means in a manner to correct displacement of the scallops from said predetermined position.

23. In a machine for grinding a scalloped, beveled cutting edge on a blade, the combination of a frame, frictional blade feeding means supported by said frame and adapted for frictional driving engagement with the blade, means on said frame for intermittently operating said blade feeding means to advance the blade through a distance equal substantially to the distance between crests of the scalloped blade, a grinding means mounted on said frame and operable to grind a scallop of the blade when the blade is positioned with its scallops in a predetermined longitudinal position with relation to said grinding means, adjustment means for effecting relative movement along a direction line longitudinally of the blade between the blade and the grinding means, a pivoted saddle member intermittently engageable with the blade edge on opposite sides of successive crests between scallops at times while the blade feeding roller is stationary, said saddle member being movable on its pivot axis in opposite directions as it engages the blade edge in accordance with displacement of the blade scallops in one direction or the other from said predetermined position, and means controlled by pivotal movement of said saddle member for operating said adjustment means in one direction or the other in accordance with the direction of pivotal movement of said saddle member, all in such manner as to correct displacements in either direction of said blade scallops from said predetermined position.

24. In a machine for grinding a scalloped, beveled cutting edge on a blade, the combination of means for supporting said blade for longitudinal travel, means for intermittently advancing said blade a distance equal to the distance between blade crests, and means for adjusting the longitudinal position of the blade between times of advancement of the blade to bring the scallops into registration with a predetermined grinding position, comprising a feeler member engageable with the scalloped blade edge and deflectable by the blade edge to different positions in accordance with the amount of misregistration of the blade scallops with reference to said predetermined grinding position, and means controlled by the deflection of said feeler member by the blade edge for longitudinally moving the blade to bring its scallops into register with said predetermined position.

WILLIAM WALTER HARTMAN.